United States Patent
Ma et al.

(10) Patent No.: US 11,269,213 B2
(45) Date of Patent: Mar. 8, 2022

(54) DISPLAY PANEL, DISPLAY DEVICE AND IN-VEHICLE DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Tao Ma, Beijing (CN); Shengli Liu, Beijing (CN); Rong Liu, Beijing (CN)

(73) Assignees: HEFEI XINSHENG OPTOELECTRONICS CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 34 days.

(21) Appl. No.: 16/958,290

(22) PCT Filed: May 7, 2019

(86) PCT No.: PCT/CN2019/085828
§ 371 (c)(1),
(2) Date: Jun. 26, 2020

(87) PCT Pub. No.: WO2020/223896
PCT Pub. Date: Nov. 12, 2020

(65) Prior Publication Data
US 2021/0232003 A1    Jul. 29, 2021

(51) Int. Cl.
*G02F 1/1335* (2006.01)
*G02F 1/1524* (2019.01)
(Continued)

(52) U.S. Cl.
CPC ........ *G02F 1/133553* (2013.01); *B60K 35/00* (2013.01); *B60R 11/0229* (2013.01);
(Continued)

(58) Field of Classification Search
CPC ............ G02F 1/133553; G02F 1/1524; G02F 1/133531; G02F 1/133514;
(Continued)

(56) References Cited

U.S. PATENT DOCUMENTS

2002/0003378 A1    1/2002  Marcus et al.
2011/0273659 A1   11/2011  Sobecki
(Continued)

FOREIGN PATENT DOCUMENTS

CN    104241324 A    12/2014
CN    10615467 A     11/2016
(Continued)

OTHER PUBLICATIONS

The book of, "Physics" second edition, Fudan University, Anti-reflection film, pp. 166-170, May 1987.
(Continued)

*Primary Examiner* — Nathanael R Briggs
(74) *Attorney, Agent, or Firm* — Dinsmore & Shohl LLP (57) ABSTRACT

The present disclosure provides a display panel, a display device, and an in-vehicle device. The display panel includes: a first substrate and a second substrate opposite to each other, wherein a liquid crystal layer is filled between the first substrate and the second substrate; a pixel electrode and a common electrode configured to generate an electric field for controlling liquid crystal molecules in the liquid crystal layer to be deflected; a light reflectance adjusting layer disposed on one side of the second substrate away from the liquid crystal layer, wherein a light reflectance of the light reflectance adjusting layer is inversely related to an intensity of an environmental electric field.

18 Claims, 3 Drawing Sheets

(51) Int. Cl.
  *B60K 35/00* (2006.01)
  *B60R 11/02* (2006.01)
  *G02F 1/1343* (2006.01)
  *G02F 1/155* (2006.01)
  *G02F 1/163* (2006.01)
  *B60R 11/00* (2006.01)

(52) U.S. Cl.
  CPC .... *G02F 1/13439* (2013.01); *G02F 1/133514* (2013.01); *G02F 1/133531* (2021.01); *G02F 1/134309* (2013.01); *G02F 1/155* (2013.01); *G02F 1/1524* (2019.01); *G02F 1/163* (2013.01); *B60K 2370/33* (2019.05); *B60K 2370/774* (2019.05); *B60K 2370/816* (2019.05); *B60R 2011/0007* (2013.01); *B60R 2011/008* (2013.01); *B60R 2011/0012* (2013.01); *G02F 2201/44* (2013.01)

(58) Field of Classification Search
  CPC .......... G02F 1/134309; G02F 1/13439; G02F 1/155; G02F 1/163; G02F 2201/44; B60K 35/00; B60K 2370/816; B60K 2370/774; B60K 2370/33; B60R 11/0229; B60R 2011/0007; B60R 2011/0012; B60R 2011/008
  See application file for complete search history.

(56) References Cited

U.S. PATENT DOCUMENTS

| | | | | |
|---|---|---|---|---|
| 2014/0168745 | A1* | 6/2014 | Satou | G02F 1/153 359/266 |
| 2014/0362429 | A1* | 12/2014 | Yokozeki | G02F 1/1506 359/267 |
| 2015/0338714 | A1* | 11/2015 | Li | G02F 1/1368 349/43 |
| 2016/0349589 | A1* | 12/2016 | Sun | G02F 1/157 |
| 2017/0117505 | A1 | 4/2017 | Kwon | |
| 2019/0285959 | A1 | 9/2019 | Guo et al. | |

FOREIGN PATENT DOCUMENTS

| | | |
|---|---|---|
| CN | 106773238 A | 5/2017 |
| CN | 108490701 A | 9/2018 |
| CN | 109001951 A | 12/2018 |

OTHER PUBLICATIONS

Chinese First Office Action dated Jul. 5, 2021 relating to CN Patent Application No. 201980000584.3.

* cited by examiner

DISPLAY PANEL, DISPLAY DEVICE AND IN-VEHICLE DEVICE

CROSS REFERENCE TO RELATED APPLICATION

The present application is a U.S. National Stage Application under 35 U.S.C. § 371 of International Patent Application No. PCT/CN2019/085828, filed on May 7, 2019, the disclosure of which is incorporated by reference herein in its entirety.

TECHNICAL FIELD

The disclosure relates to the technical field of display, in particular to a display panel, a display device and an in-vehicle device.

BACKGROUND

In the related art, after a user turns on the liquid crystal display device, an electric field is generated between the pixel electrode and the common electrode in the liquid crystal display device, so that liquid crystal molecules in the liquid crystal layer are driven to deflect. Light can thus pass through the liquid crystal layer, which is convenient for users to view the corresponding information. After the liquid crystal display device is turned off by the user, the electric field between the pixel electrode and the common electrode disappears and the liquid crystal molecules in the liquid crystal layer are restored to an original state. At this time, light cannot pass through the liquid crystal layer.

SUMMARY

According to a first aspect of embodiments of the present disclosure, a display panel is provided. The display panel comprises a first substrate and a second substrate disposed opposite to each other, wherein a liquid crystal layer is filled between the first substrate and the second substrate; a pixel electrode and a common electrode configured to generate an electric field for controlling liquid crystal molecules in the liquid crystal layer to be deflected; and a light reflectance adjusting layer disposed on one side of the second substrate away from the liquid crystal layer, wherein a light reflectance of the light reflectance adjusting layer is inversely related to an intensity of an environmental electric field.

In some embodiments, the light reflectance adjusting layer comprises: an ion storage layer and an electrochromic layer disposed opposite to each other; and an ion conducting layer disposed between the ion storage layer and the electrochromic layer.

In some embodiments, a material of the electrochromic layer comprises at least one of $WO_3$, $MoO_3$, $TiO_2$, $IrO_2$, $NiO$, $Co_3O_4$, or Mg—Ni.

In some embodiments, the light reflectance adjusting layer further comprises: a first transparent electrode disposed on one side of the ion storage layer away from the ion conducting layer; and a second transparent electrode disposed on one side of the electrochromic layer away from the ion conducting layer.

In some embodiments, the display panel further comprises an electrical connector configured to electrically connect the first transparent electrode with the pixel electrode, wherein the second transparent electrode is grounded.

In some embodiments, the pixel electrode is disposed on one side of the first substrate close to the liquid crystal layer; and the common electrode is disposed on one side of the second substrate close to the liquid crystal layer.

In some embodiments, the pixel electrode and the common electrode are disposed on one side of the first substrate close to the liquid crystal layer.

In some embodiments, the display panel further comprises an insulating layer disposed between the first substrate and the liquid crystal layer, wherein: the pixel electrode is disposed on one side of the insulating layer close to the liquid crystal layer; and the common electrode is disposed on one side of the insulating layer close to the first substrate.

In some embodiments, the display panel further comprises: a first light transmitting layer disposed between the second substrate and the light reflectance adjusting layer, wherein a refractive index of the first light transmitting layer is larger than a refractive index of the second substrate and a thickness of the first light transmitting layer is an integer multiple of a quarter of a wavelength of light incident into the first light transmitting layer; and a second light transmitting layer disposed on one side of the first light transmitting layer close to the light reflectance adjusting layer, wherein a refractive index of the second light transmitting layer is larger than the refractive index of the first light transmitting layer.

In some embodiments, the display panel further comprises: a first polarizing plate disposed on one side of the first substrate away from the liquid crystal layer; and a second polarizing plate disposed on one side of the light reflectance adjusting layer away from the second substrate, wherein a light transmission axis direction of the second polarizing plate is perpendicular to a light transmission axis direction of the first polarizing plate.

In some embodiments, the display panel further comprises: a color filter layer disposed on one side of the second polarizing plate close to the light reflectance adjusting layer.

In some embodiments, an initial orientation of the liquid crystal molecules in the liquid crystal layer is perpendicular to the light transmission axis direction of the first polarizing plate.

According to a second aspect of the embodiments of the present disclosure, a display device is provided. The display device includes the display panel, the display panel comprising: a first substrate and a second substrate disposed opposite to each other, wherein a liquid crystal layer is filled between the first substrate and the second substrate; a pixel electrode and a common electrode configured to generate an electric field for controlling liquid crystal molecules in the liquid crystal layer to be deflected; and a light reflectance adjusting layer disposed on one side of the second substrate away from the liquid crystal layer, wherein a light reflectance of the light reflectance adjusting layer is inversely related to an intensity of an environmental electric field.

In some embodiments, the light reflectance adjusting layer comprises: an ion storage layer and an electrochromic layer disposed opposite to each other; and an ion conducting layer disposed between the ion storage layer and the electrochromic layer.

In some embodiments, the light reflectance adjusting layer further comprises: a first transparent electrode disposed on one side of the ion storage layer away from the ion conducting layer; and a second transparent electrode disposed on one side of the electrochromic layer away from the ion conducting layer.

In some embodiments, the pixel electrode and the common electrode are disposed on one side of the first substrate close to the liquid crystal layer.

In some embodiments, the display panel further comprises an insulating layer disposed between the first substrate and the liquid crystal layer, wherein: the pixel electrode is disposed on one side of the insulating layer close to the liquid crystal layer; and the common electrode is disposed on one side of the insulating layer close to the first substrate.

In some embodiments, the display panel further comprises: a first light transmitting layer disposed between the second substrate and the light reflectance adjusting layer, wherein a refractive index of the first light transmitting layer is larger than a refractive index of the second substrate and a thickness of the first light transmitting layer is an integer multiple of a quarter of a wavelength of light incident into the first light transmitting layer; and a second light transmitting layer disposed on one side of the first light transmitting layer close to the light reflectance adjusting layer, wherein a refractive index of the second light transmitting layer is larger than the refractive index of the first light transmitting layer.

According to a third aspect of the embodiments of the present disclosure, an in-vehicle device is provided. The in-vehicle device includes: a display device as claimed in any of the above-mentioned embodiment, and mounted on a moveable bracket.

In some embodiments, the movable bracket is disposed between a position of a center console and a position of a copilot seat.

Other features of the present disclosure and advantages thereof will become apparent from the following detailed description of exemplary embodiments thereof, which proceeds with reference to the accompanying drawings.

BRIEF DESCRIPTION OF THE DRAWINGS

The drawings that form a part of the description describe the embodiments of the present disclosure, and together with the description are used to explain the principles of the present disclosure.

The present disclosure may be more clearly understood from the following detailed description taken in conjunction with the accompanying drawings, in which.

It should be understood that the dimensions of the various parts shown in the drawings are not drawn to scale. Further, the same or similar reference numbers denote the same or similar components.

DETAILED DESCRIPTION

Various exemplary embodiments of the present disclosure will now be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that: the relative arrangement of parts and steps, the composition of materials and values set forth in these embodiments are to be construed as illustrative only and not as limiting unless otherwise specifically stated.

The use of "first", "second", and similar words in this disclosure is not intended to indicate any order, quantity, or importance, but is only used to distinguish one element from another. The word "comprise" or "include", and the like, means that the element preceding the word comprises the elements listed after the word, and does not exclude the possibility that other elements may also be included.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to one of ordinary skill in the relevant art may not be discussed in detail but are intended to be part of the specification where appropriate.

The inventors have noticed that in a case where the liquid crystal display device is used as an in-vehicle device, due to the limited space in the car, users generally expect that the liquid crystal display device can function as a mirror when it does not perform display. However, in the related art, when the liquid crystal display device is turned off, the liquid crystal display device is in a black screen state. The liquid crystal display device has low reflectance, so that the mirror reflection function cannot be provided.

Accordingly, the present disclosure proposes a solution capable of adjusting the reflectance of the liquid crystal display device, so that the liquid crystal display device has a specular reflection function while not performing display.

Figure 1:
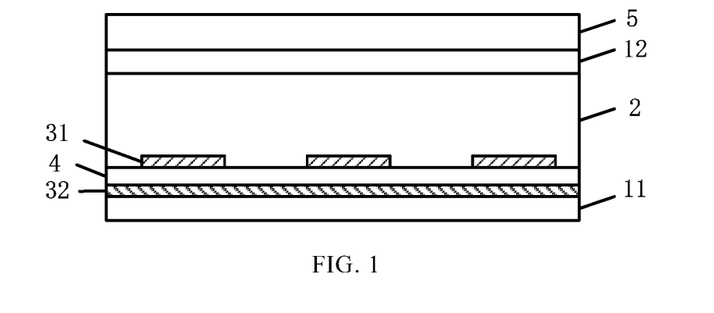
FIG. 1 is a schematic structural diagram of a display panel according to one embodiment of the present disclosure.

FIG. 1 is a schematic structural diagram of a display panel according to one embodiment of the present disclosure.

As shown in FIG. 1, the display panel includes a first substrate 11 and a second substrate 12 disposed opposite to each other. A liquid crystal layer 2 is filled between the first substrate 11 and the second substrate 12. A pixel electrode 31 and a common electrode 32 are configured to generate an electric field for controlling the liquid crystal molecules in the liquid crystal layer 2 to be deflected. A light reflectance adjusting layer 5 is disposed on one side of the second substrate 12 away from the liquid crystal layer 2. The light reflectance of the light reflectance adjusting layer 5 is inversely related to an intensity of an environmental electric field.

In some embodiments, a material of the pixel electrode 31 and a material of the common electrode 32 include ITO (indium tin oxide) or other transparent conductive materials.

In the display panel provided by the above embodiment of the present disclosure, the light reflectance adjusting layer 5 is disposed on one side of the second substrate 12 away from the liquid crystal layer 2. The light reflectance of the light reflectance adjusting layer 5 is inversely related to the intensity of the environmental electric field. In a case where the intensity of the environmental electric field is larger, the light reflectance of the light reflectance adjusting layer 5 is smaller, and the corresponding transmittance is larger, so that light passes through the display panel. In a case where the intensity of the environmental electric field is smaller, the light reflectance of the light reflectance adjusting layer 5 is larger, and the corresponding transmittance is smaller, so that the display panel provides a specular reflection function.

Figure 2:
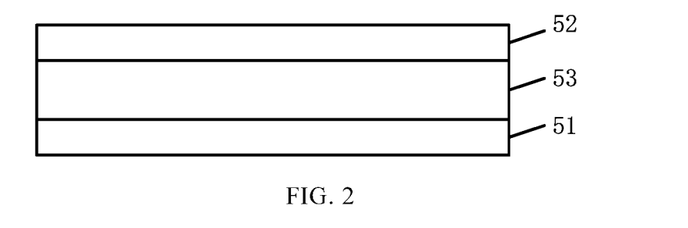
FIG. 2 is a schematic structural diagram of a light reflectance adjusting layer according to one embodiment of the present disclosure.

FIG. 2 is a schematic structural diagram of a light reflectance adjusting layer according to one embodiment of the present disclosure.

As shown in FIG. 2, the light reflectance adjusting layer includes an ion storage layer 51 and an electrochromic layer 52 disposed opposite to each other. An ion conducting layer 53 is disposed between the ion storage layer 51 and the electrochromic layer 52. Under the action of the environmental electric field, ions (e.g., $H_+$, $Li_+$, $Na_+$, etc.) in the ion storage layer 51 enter the electrochromic layer 52 through the ion conducting layer 53. The ion conducting layer 53 is a transmission path of ions. A material of the ion conducting layer 53 may include an all-solid polymer electrolyte, a gel polymer electrolyte, or a composite polymer electrolyte. A material of the electrochromic layer 52 comprises at least one of $WO_3$, $MoO_3$, $TiO_2$, $IrO_2$, $NiO$, $Co_3O_4$, or magnesium-nickel alloy Mg—Ni.

It should be noted that after the ions enter the electrochromic layer 52, the ions react with the reactive material in the electrochromic layer 52 to form a new compound. The newly generated compound has higher transmittance and lower reflectance, thereby facilitating the light to pass through the light reflectance adjusting layer. After the intensity of the environmental electric field is reduced, the compound generated in the electrochromic layer 52 is further decomposed into corresponding ions and reactive materials. Since the reflectance of the reactive material itself is higher, the display panel can provide a specular reflection function.

Figure 3:
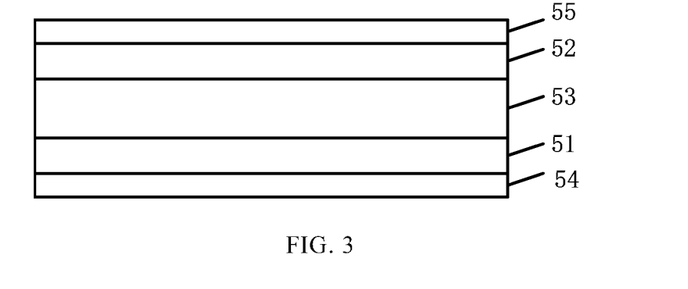
FIG. 3 is a schematic structural diagram of a light reflectance adjusting layer according to another embodiment of the present disclosure.

FIG. 3 is a schematic structural diagram of a light reflectance adjusting layer according to another embodiment of the present disclosure. FIG. 3 is different from FIG. 2 in that, in the embodiment shown in FIG. 3, the light reflectance adjusting layer further includes a first transparent electrode 54 and a second transparent electrode 55.

The first transparent electrode 54 is disposed on one side of the ion storage layer 51 away from the ion conducting layer 53. The second transparent electrode 55 is disposed on one side of the electrochromic layer 52 away from the ion conducting layer 53. By applying a voltage to the first transparent electrode 54 and the second transparent electrode 55, an electric field is generated between the first transparent electrode 54 and the second transparent electrode for controlling the environmental electric field of the electrochromic layer 52.

In some embodiments, a material of first transparent electrode 54 and a material of second transparent electrode 55 comprise ITO or other transparent conductive materials.

In some embodiments, the environmental electric field of the light reflectance adjusting layer 5 is controlled by the pixel electrode 31 and the common electrode 32.

As shown in FIG. 1, the display panel further includes an insulating layer 4. The insulating layer 4 is disposed between the first substrate 11 and the liquid crystal layer 2. The pixel electrode 31 is disposed on one side of the insulating layer 4 close to the liquid crystal layer 2, and the common electrode 32 is disposed on one side of the insulating layer 4 close to the first substrate 11.

In some embodiments, the pixel electrode 31 is a slit electrode, and the common electrode 32 is a planar electrode.

Figure 4:
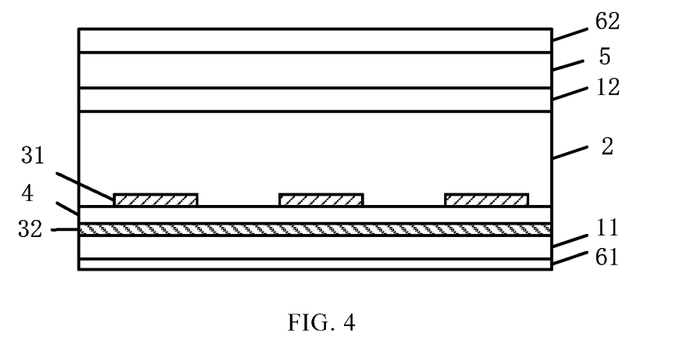
FIG. 4 is a schematic structural diagram of a display panel according to another embodiment of the present disclosure.

FIG. 4 is a schematic structural diagram of a display panel according to another embodiment of the present disclosure. FIG. 4 differs from FIG. 1 in that, in the embodiment shown in FIG. 4, the display panel further comprises a first polarizing plate 61 and a second polarizing plate 62.

The first polarizing plate 61 is disposed on one side of the first substrate 11 away from the liquid crystal layer 2. The second polarizing plate 62 is disposed on one side of the light reflectance adjusting layer 5 away from the second substrate 12. A light transmission axis direction of the first polarizing plate 61 is perpendicular to a light transmission axis direction of the second polarizing plate 62. The light transmission axis direction of the polarizing plate is a direction of a light vector that can pass through the polarizing plate.

In some embodiments, an initial orientation of the liquid crystal molecules in the liquid crystal layer 2 is perpendicular to the light transmission axis direction of the first polarizing plate 61. Therefore, light cannot pass through the liquid crystal layer and the display panel cannot perform display in a case where no voltage is applied to the pixel electrode 31 and the common electrode 32. In addition, an electric field is not formed between the pixel electrode 31 and the common electrode 32. In this case, the environmental electric field of the light reflectance adjusting layer 5 is small, resulting in a larger reflectance of the light reflectance adjusting layer 5. Thus, the display panel can provide a specular reflection function when not performing display.

Figure 5:
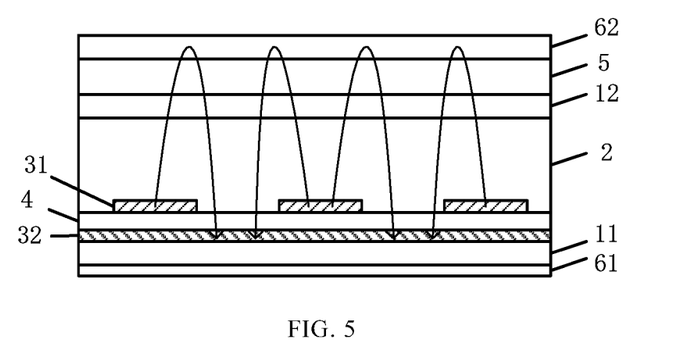
FIG. 5 is a schematic diagram of an electric field generated in a display panel according to one embodiment of the present disclosure.

FIG. 5 is a schematic diagram of an electric field generated in a display panel according to one embodiment of the present disclosure.

As shown in FIG. 5, in a case where a voltage is applied to the pixel electrode 31 and the common electrode 32, an electric field is formed between the pixel electrode 31 and the common electrode 32, causing liquid crystal molecules in the liquid crystal layer to be deflected, so that light can pass through the liquid crystal layer 2. In addition, the electric field formed between the pixel electrode 31 and the common electrode 32 may have an influence on the light reflectance adjusting layer 5. In this case, the environmental electric field of the light reflectance adjusting layer 5 increases, resulting in a decrease in the reflectance of the light reflectance adjusting layer 5 and an increase in the transmittance, thereby facilitating the display panel to provide the function of display.

Figure 6:
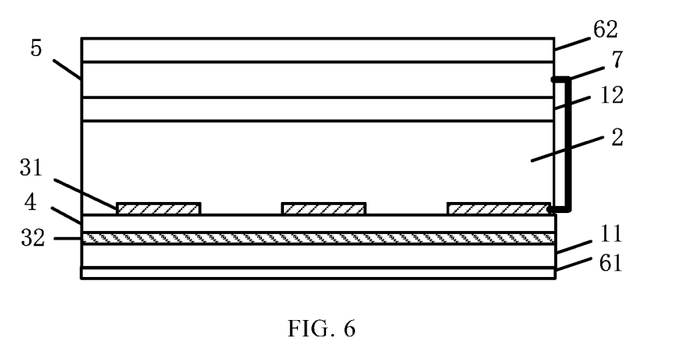
FIG. 6 is a schematic structural diagram of a display panel according to another embodiment of the present disclosure.

FIG. 6 is a schematic structural diagram of a display panel according to another embodiment of the present disclosure. FIG. 6 differs from FIG. 4 in that in the embodiment shown in FIG. 6, the display panel further comprises an electrical connection member 7.

The electrical connection member 7 is configured to electrically connect the pixel electrode 31 with the first transparent electrode 54 in the light reflectance adjusting layer 5. Further, the second transparent electrode 55 in the light reflectance adjusting layer 5 is grounded.

It should be noted here that in the embodiment shown in FIG. 6, the environmental electric field of the light reflectance adjusting layer 5 is controlled by the pixel electrode 31 and the common electrode 32, and the first transparent electrode 54 and the second transparent electrode 55 in the light reflectance adjusting layer 5.

In some embodiments, the environmental electric field of the light reflectance adjusting layer 5 may also be controlled only by the first transparent electrode 54 and the second transparent electrode 55 in the light reflectance adjusting layer 5.

Figure 7:
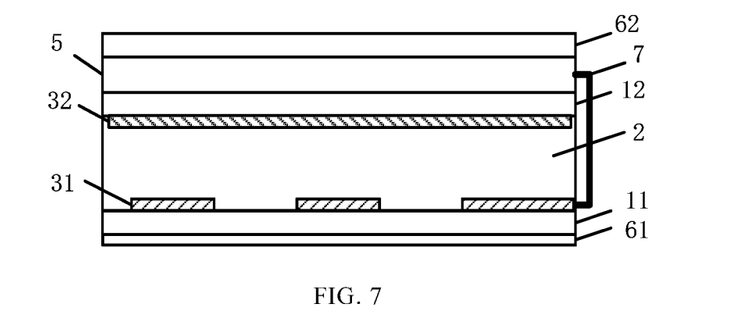
FIG. 7 is a schematic structural diagram of a display panel according to yet another embodiment of the present disclosure.

FIG. 7 is a schematic structural diagram of a display panel according to still another embodiment of the present disclosure. FIG. 7 is different from FIG. 6 in that, in the embodiment shown in FIG. 7, the pixel electrode 31 is disposed on one side of the first substrate 11 close to the liquid crystal layer 2, and the common electrode 32 is disposed on one side of the second substrate 12 close to the liquid crystal layer 2.

In the embodiment shown in FIG. 7, the electric field between the pixel electrode 31 and the common electrode 32 will not have an influence on the light reflectance adjusting layer 5. The environmental electric field of the light reflectance adjusting layer 5 is controlled only by the first transparent electrode 54 and the second transparent electrode 55 in the light reflectance adjusting layer 5.

It should be noted here that in the embodiment shown in FIG. 1, the environmental electric field of the light reflectance adjusting layer 5 is controlled by the pixel electrode 31 and the common electrode 32, and no other lead wires need to be disposed, so that the bezel of the display device can be reduced. In the embodiment shown in FIG. 6, the environmental electric field of the light reflectance adjusting layer 5 is controlled by the pixel electrode 31 and the common electrode 32, and the first transparent electrode 54 and the second transparent electrode 55 in the light reflectance adjusting layer 5. In the embodiment shown in FIG. 7, the environmental electric field of the light reflectance adjusting layer 5 is controlled by the first transparent electrode 54 and the second transparent electrode 55 in the light reflectance adjusting layer 5. Since the first transparent electrode 54 and the second transparent electrode 55 in the light reflectance adjusting layer 5 can provide a stronger electric field, a better control effect can be obtained.

Figure 8:
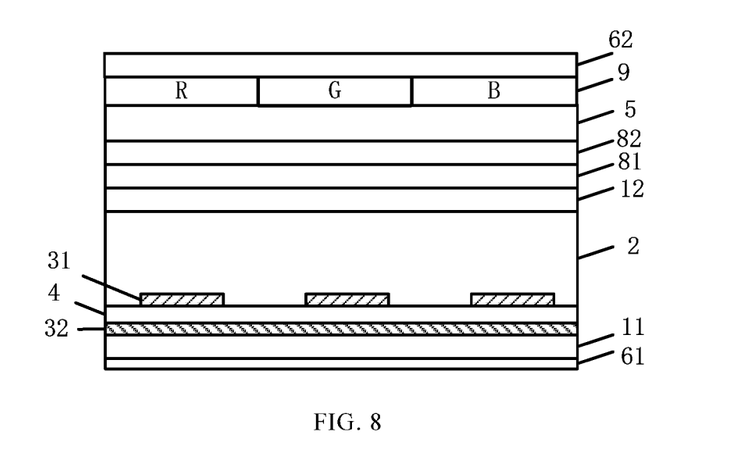
FIG. 8 is a schematic structural diagram of a display panel according to still another embodiment of the present disclosure.

FIG. 8 is a schematic structural diagram of a display panel according to still another embodiment of the present disclosure. FIG. 8 is different from FIG. 4 in that, in the embodiment shown in FIG. 8, the display panel further includes a first light transmitting layer 81 and a second light transmitting layer 82.

The first light transmitting layer 81 is disposed between the second substrate 12 and the light reflectance adjusting layer 5. The second light transmitting layer 82 is disposed on one side of the first light transmitting layer 81 close to the light reflectance adjusting layer 5. A refractive index of the first light transmitting layer 81 is greater than a refractive index of the second substrate 12 and smaller than a refractive index of the second light transmitting layer 82. A thickness of the first light transmitting layer 81 is an integral multiple of a quarter of the wavelength of light incident into the first light transmitting layer 81.

In a case where a light passes through the second substrate 12, the first light transmitting layer 81, and the second light transmitting layer 82, the light generates reflected light n1 when entering the first light transmitting layer 81 from the second substrate 12, and the light generates reflected light n2 when entering the second light transmitting layer 82 from the first light transmitting layer 81. In a case where the refractive index of the second substrate 12 is smaller than the refractive index of the first light transmitting layer 81 and the refractive index of the first light transmitting layer 81 is smaller than the refractive index of the second light transmitting layer 82, if the reflected light n1 and n2 satisfy the interference cancellation condition, that is, $2d=(2a+1)\lambda/2$, the reflected light n1 and n2 cancel each other, so that the intensity of transmitted light can be enhanced. In the above formula, the parameter a is a natural number, the parameter d is the thickness of the first light transmitting layer 81, and the parameter $\lambda$ is the wavelength of light.

In some embodiments, as shown in FIG. 8, a color filter layer 9 is further included in the display panel. The color filter layer 9 is disposed on one side of the second polarizing plate 62 close to the light reflectance adjusting layer 5. By providing the color filter layer 9, the display panel can display a color image.

It should be noted here that in the embodiments shown in FIG. 6 and FIG. 7, the first light transmitting layer 81 may be disposed between the second substrate 12 and the light reflectance adjusting layer 5, and the second light transmitting layer 82 may be disposed on one side of the first light transmitting layer 81 close to the light reflectance adjusting layer 5, so as to enhance the intensity of transmitted light. The color filter layer 9 may be further disposed on one side of the second polarizing plate 62 close to the light reflectance adjusting layer 5, so that the display panel can display a color image.

The present disclosure also provides a display device. The display device includes the display panel according to any one of the embodiments of FIGS. 1 to 8. The display device can be any product or component with a display function, such as a display, a mobile phone, a tablet personal computer, a television, a notebook computer, a digital photo frame, a navigator and the like.

The present disclosure also provides an in-vehicle device. The in-vehicle device includes the display device according to any one of the embodiments described above. The display device is mounted on the movable support. In some embodiments, the movable bracket is disposed between a position of a center console and a position of a copilot seat, so that the user can make an observation through the display device in the in-vehicle device in the case where the display device provides the mirror reflection function.

Through testing, the display device disposed by the present disclosure has the light reflectance of not less than 80% when not performing display. In a case where the display device is used as an in-vehicle device, the mirror reflection function can be effectively provided to the user.

In the display panel provided in the above embodiments of the present disclosure, the environmental electric field of the light reflectance adjusting layer may be controlled by the pixel electrode and the common electrode for controlling the deflection of the liquid crystal molecules, and may be controlled by the first transparent electrode and the second transparent electrode in the light reflectance adjusting layer, and may also be controlled by the pixel electrode and the common electrode for controlling the deflection of the liquid crystal molecules, and the first transparent electrode and the second transparent electrode in the light reflectance adjusting layer. The user can select a corresponding electric field control mode according to the requirement.

The display panel provided by the above embodiments of the present disclosure may be used in an ADS (Advanced Super Dimension Switch), an IPS (In Plane Switching) mode, a TN (Twisted Nematic) mode, or a VA (Vertical Alignment) mode.

So far, the embodiments of the present disclosure have been described in detail. Some details well known in the art have not been described in order to avoid obscuring the concepts of the present disclosure. Those skilled in the art can now fully appreciate how to implement the teachings disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A display panel, comprising:
   a first substrate and a second substrate disposed opposite to each other, wherein a liquid crystal layer is filled between the first substrate and the second substrate;
   a pixel electrode and a common electrode configured to generate an electric field for controlling liquid crystal molecules in the liquid crystal layer to be deflected;
   a light reflectance adjusting layer disposed on one side of the second substrate away from the liquid crystal layer, wherein a light reflectance of the light reflectance adjusting layer is inversely related to an intensity of an environmental electric field;
   a first light transmitting layer disposed between the second substrate and the light reflectance adjusting layer, wherein a refractive index of the first light transmitting layer is larger than a refractive index of the second substrate and a thickness of the first light transmitting layer is an integer multiple of a quarter of a wavelength of light incident into the first light transmitting layer; and
   a second light transmitting layer disposed on one side of the first light transmitting layer close to the light reflectance adjusting layer, wherein a refractive index of the second light transmitting layer is larger than the refractive index of the first light transmitting layer.

2. The display panel according to claim 1, wherein the light reflectance adjusting layer comprises:
   an ion storage layer and an electrochromic layer disposed opposite to each other; and
   an ion conducting layer disposed between the ion storage layer and the electrochromic layer.

3. The display panel according to claim 2, wherein a material of the electrochromic layer comprises at least one of $WO_3$, $MoO_3$, $TiO_2$, $IrO_2$, $NiO$, $Co_3O_4$ or Mg—Ni.

4. The display panel according to claim 2, wherein the light reflectance adjusting layer further comprises:
   a first transparent electrode disposed on one side of the ion storage layer away from the ion conducting layer; and
   a second transparent electrode disposed on one side of the electrochromic layer away from the ion conducting layer.

5. The display panel according to claim 4, further comprising an electrical connector configured to electrically connect the first transparent electrode with the pixel electrode,
   wherein the second transparent electrode is grounded.

6. The display panel according to claim 5, wherein:
   the pixel electrode is disposed on one side of the first substrate close to the liquid crystal layer; and
   the common electrode is disposed on one side of the second substrate close to the liquid crystal layer.

7. The display panel according to claim 1, wherein
   the pixel electrode and the common electrode are disposed on one side of the first substrate close to the liquid crystal layer.

8. The display panel according to claim 7, further comprising an insulating layer disposed between the first substrate and the liquid crystal layer, wherein:
   the pixel electrode is disposed on one side of the insulating layer close to the liquid crystal layer; and
   the common electrode is disposed on one side of the insulating layer close to the first substrate.

9. The display panel according to claim 1, further comprising:
   a first polarizing plate disposed on one side of the first substrate away from the liquid crystal layer; and
   a second polarizing plate disposed on one side of the light reflectance adjusting layer away from the second substrate, wherein a light transmission axis direction of the second polarizing plate is perpendicular to a light transmission axis direction of the first polarizing plate.

10. The display panel according to claim 9, further comprising:
    a color filter layer disposed on one side of the second polarizing plate close to the light reflectance adjusting layer.

11. The display panel according to claim 9, wherein an initial orientation of the liquid crystal molecules in the liquid crystal layer is perpendicular to the light transmission axis direction of the first polarizing plate.

12. A display device, comprising a display panel, the display panel comprising:
    a first substrate and a second substrate disposed opposite to each other, wherein a liquid crystal layer is filled between the first substrate and the second substrate;
    a pixel electrode and a common electrode configured to generate an electric field for controlling liquid crystal molecules in the liquid crystal layer to be deflected;
    a light reflectance adjusting layer disposed on one side of the second substrate away from the liquid crystal layer, wherein a light reflectance of the light reflectance adjusting layer is inversely related to an intensity of an environmental electric field;
    a first light transmitting layer disposed between the second substrate and the light reflectance adjusting layer, wherein a refractive index of the first light transmitting layer is larger than a refractive index of the second substrate and a thickness of the first light transmitting layer is an integer multiple of a quarter of a wavelength of light incident into the first light transmitting layer; and
    a second light transmitting layer disposed on one side of the first light transmitting layer close to the light reflectance adjusting layer, wherein a refractive index of the second light transmitting layer is larger than the refractive index of the first light transmitting layer.

13. An in-vehicle device, comprising the display device of claim 12, and mounted on a movable bracket.

14. The in-vehicle device according to claim 13, wherein the movable bracket is disposed between a position of a center console and a position of a copilot seat.

15. The display device according to claim 12, wherein the light reflectance adjusting layer comprises:
    an ion storage layer and an electrochromic layer disposed opposite to each other; and
    an ion conducting layer disposed between the ion storage layer and the electrochromic layer.

16. The display device according to claim 15, wherein the light reflectance adjusting layer further comprises:

a first transparent electrode disposed on one side of the ion storage layer away from the ion conducting layer; and a second transparent electrode disposed on one side of the electrochromic layer away from the ion conducting layer.

17. The display device according to claim 12, wherein the pixel electrode and the common electrode are disposed on one side of the first substrate close to the liquid crystal layer.

18. The display device according to claim 17, the display panel further comprising an insulating layer disposed between the first substrate and the liquid crystal layer, wherein the pixel electrode is disposed on one side of the insulating layer close to the liquid crystal layer; and the common electrode is disposed on one side of the insulating layer close to the first substrate.

\* \* \* \* \*